(12) United States Patent
Eilers et al.

(10) Patent No.: US 8,807,620 B1
(45) Date of Patent: Aug. 19, 2014

(54) PARTITION ASSEMBLIES FOR USE IN VEHICLES

(71) Applicant: PACCAR Inc, Bellevue, WA (US)

(72) Inventors: Benjamin C. Eilers, Monroe, WA (US); Greg William Bonsen, Bellevue, WA (US); Jonathan Duncan, Seattle, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 13/801,126

(22) Filed: Mar. 13, 2013

(51) Int. Cl.
*B60R 7/02* (2006.01)

(52) U.S. Cl.
USPC .......................................... 296/24.4

(58) Field of Classification Search
USPC ........ 296/24.4, 24.43, 37.1, 37.8, 37.6, 37.16
See application file for complete search history.

(56) References Cited

U.S. PATENT DOCUMENTS

| | | | |
|---|---|---|---|
| 4,261,613 A | | 4/1981 | Alford |
| 4,366,977 A * | | 1/1983 | Davis et al. ................. 296/24.41 |
| 4,436,177 A | | 3/1984 | Elliston |
| 5,415,506 A * | | 5/1995 | Payne ........................... 410/129 |
| 6,015,178 A * | | 1/2000 | Haack ........................... 296/39.2 |
| 6,174,116 B1 * | | 1/2001 | Brand ............................ 410/140 |
| 6,308,873 B1 * | | 10/2001 | Baldas et al. ................. 224/281 |
| 6,364,389 B1 | | 4/2002 | Beigel |
| 6,681,588 B2 | | 1/2004 | Zeigler |
| 6,986,541 B1 * | | 1/2006 | Haack ........................... 296/39.2 |
| 7,017,977 B1 * | | 3/2006 | Kelter ........................... 296/182.1 |
| 7,145,788 B2 | | 12/2006 | Plummer |
| 7,232,172 B2 * | | 6/2007 | Kiester et al. ................. 296/39.2 |
| 7,243,968 B2 * | | 7/2007 | Kiester et al. ................. 296/37.6 |
| 7,290,820 B1 * | | 11/2007 | Smith et al. ................... 296/39.2 |
| 7,631,919 B2 * | | 12/2009 | Schrader ....................... 296/37.6 |
| 8,215,693 B2 * | | 7/2012 | Ulita ............................. 296/37.1 |
| 2005/0161974 A1 | | 7/2005 | Atcravi |
| 2007/0131408 A1 | | 6/2007 | Zeigler |
| 2009/0102231 A1 | | 4/2009 | Atcravi |
| 2011/0047891 A1 | | 3/2011 | Andretich |
| 2012/0205943 A1 * | | 8/2012 | Nelson et al. ............... 296/186.1 |

FOREIGN PATENT DOCUMENTS

| | | |
|---|---|---|
| GB | 190600100 A | 12/1906 |
| GB | 191165 A | 1/1923 |
| GB | 252960 A | 6/1926 |
| GB | 2 003 433 A | 3/1979 |
| GB | 2 447 712 A | 9/2008 |
| JP | 9-277939 A | 10/1997 |

* cited by examiner

*Primary Examiner* — H Gutman
(74) *Attorney, Agent, or Firm* — Christensen O'Connor Johnson Kindness PLLC

(57) ABSTRACT

A partition assembly for use in vehicles. The partition assembly aim to separate a first interior space of a vehicle, such as an operator space, from a second interior space of the vehicle, such as an aft living space. The partition assembly can be secured to the vehicle along its vertical sides. The partition assembly can include connection interfaces configured to frictionally fit, including being press fit, into a gap formed between interior trim of the vehicle.

15 Claims, 3 Drawing Sheets

PARTITION ASSEMBLIES FOR USE IN VEHICLES

BACKGROUND

The interior of vehicles, such as semi-trucks, vans, and mobile homes, often include a forward-facing operator space and an aft living, sleeping, and/or storage space. Typically, the operator space is separated from the aft space by the back surface of the driver and passenger seats of the operator space. Occasionally in such close quarters, activity in the operator space may be disruptive to a person in the aft space or vice versa. To address this problem, among others, curtains have been used to assist in separating the operator space from the aft space. Typically, the curtain hangs from an upper surface of the vehicle's interior and extends downward thereby creating a barrier between the operator space from the living space.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a partition assembly is provided for use in a vehicle. The vehicle includes opposing first and second support structures each having a first interior trim secured thereto and a second interior trim secured thereto at a spaced apart distance from the first interior trim thereby creating a gap therebetween. The partition assembly includes a main portion configured to traverse an interior portion of the vehicle thereby creating at least a partial barrier between a first interior space in the vehicle and a second interior space in the vehicle, and connection interfaces located at lateral ends of the main portion. In some embodiments, the connection interfaces include at least one outer surface, and the connection interfaces are configured to fit within the gap and be secured to the vehicle between the at least one outer surface of the connection, interfaces and one or more surfaces in the gap.

In accordance with another aspect of the present disclosure, a vehicle is provided. The vehicle includes a first interior space, a second interior space, a support structure having a first end proximate the first interior space and a second end proximate the second interior space, a first interior trim secured to the support structure at the first end, a second interior trim secured to the support structure at the second end a spaced apart distance from the first interior trim thereby creating a gap therebetween, and a partition assembly. In some embodiments, the partition assembly includes a main portion configured to traverse an interior portion of the vehicle thereby creating at least a partial barrier between the first interior space and the second interior space, and a connection interface located at a lateral end of the main portion. The connection interface is configured to fit into the gap and to secure to the vehicle via frictional forces.

In accordance with another aspect of the present disclosure, a vehicle is provided. The vehicle includes a forward interior space, an aft interior space, and first and second opposing support structures, each having a first end proximate the forward interior space and a second end proximate the aft interior space. First and second forward interior trim is secured to the first and second support structures at the first end. First and second aft interior trim secured to the first and second support structures at the second end. In some embodiments, the first and second aft interior trim is secured to the first and second support structures a spaced apart distance from the first and second forward interior trim thereby creating a gap therebetween. The vehicle further includes a partition assembly that includes a main portion configured to traverse an interior portion of the vehicle thereby creating at least a partial barrier between the forward interior space and the aft interior space, and connection interfaces located at respective lateral ends of the main portion. The connection interfaces are configured to fit into the gaps and are secured within the gaps such that the main portion traverses the interior portion of the vehicle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion provides examples of partition assemblies for use in vehicles. Generally described, the partition assemblies described herein aim to separate a first interior space of a vehicle, such as an operator space, from a second interior space of the vehicle, such as an aft living space. In one or more embodiments described herein, the vertical sides of the partition assemblies are secured to vertical support structures of the vehicle. In one embodiment, the partition assembly includes connection interfaces configured to press fit into a gap formed between interior trim of the vehicle. In another embodiment, the partition assembly includes fasteners configured to secure to at least one of the vertical support structure and the sides of the interior trim of the vehicle.

Although the partition assemblies may be shown and described in reference to a tractor, such as a Class 8 tractor, for separating a cab compartment from a sleeper compartment, it should be appreciated that the methods and systems described herein may be applied to other vehicles, such as, for example, vans, buses, trains, mobile homes, or any other vehicles that may allow for a first interior space of the vehicle to be separated from a second interior space. Accordingly, the following descriptions and illustrations herein should be considered illustrative in nature, and thus, not limiting the scope of the claimed subject matter.

While some embodiments have been illustrated and described, it will be appreciated that various changes can be made therein without departing from the spirit and scope of the disclosure. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Additionally, it will be appreciated that embodiments of the present disclosure may employ any combination of the features described herein.

Figure 1:
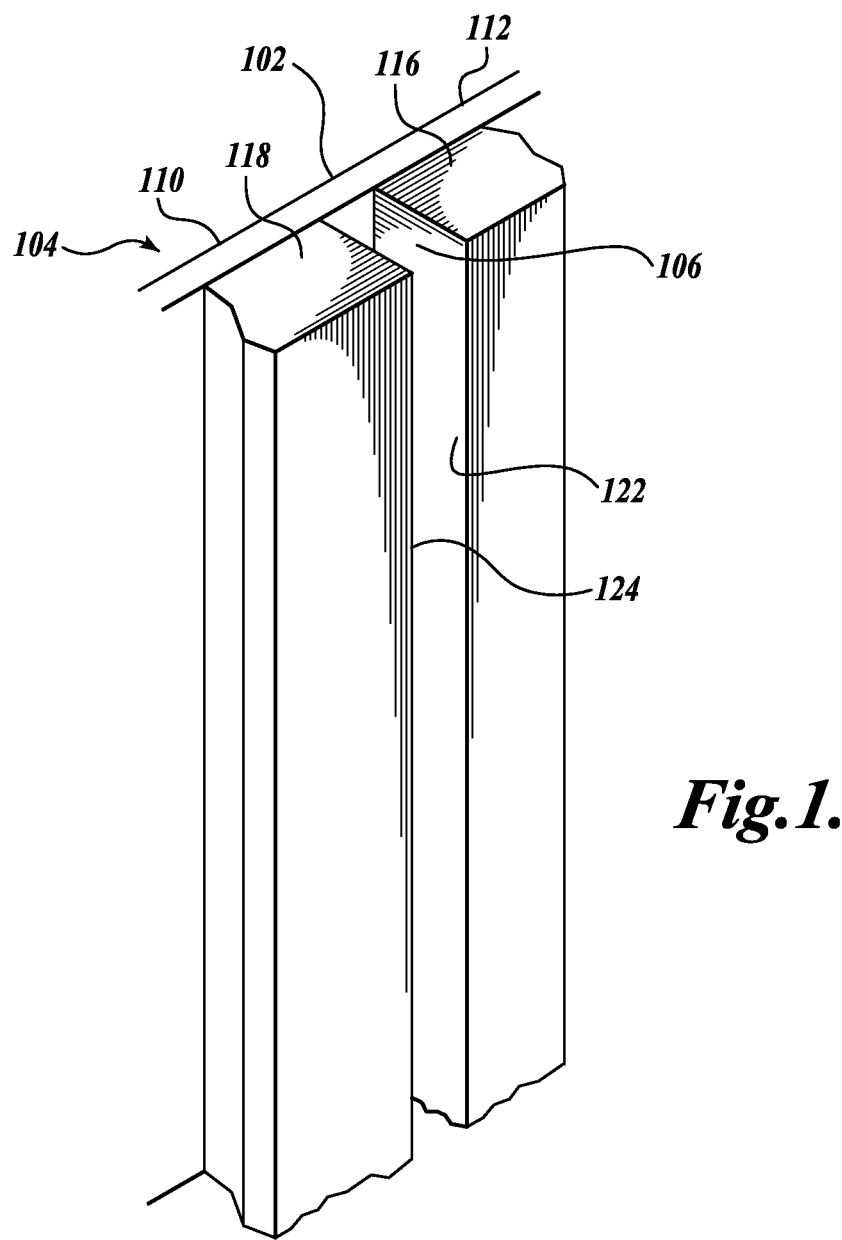
FIG. 1 is a partial isometric view of a partition assembly suitable for use in an interior portion of a vehicle.
Figure 2:
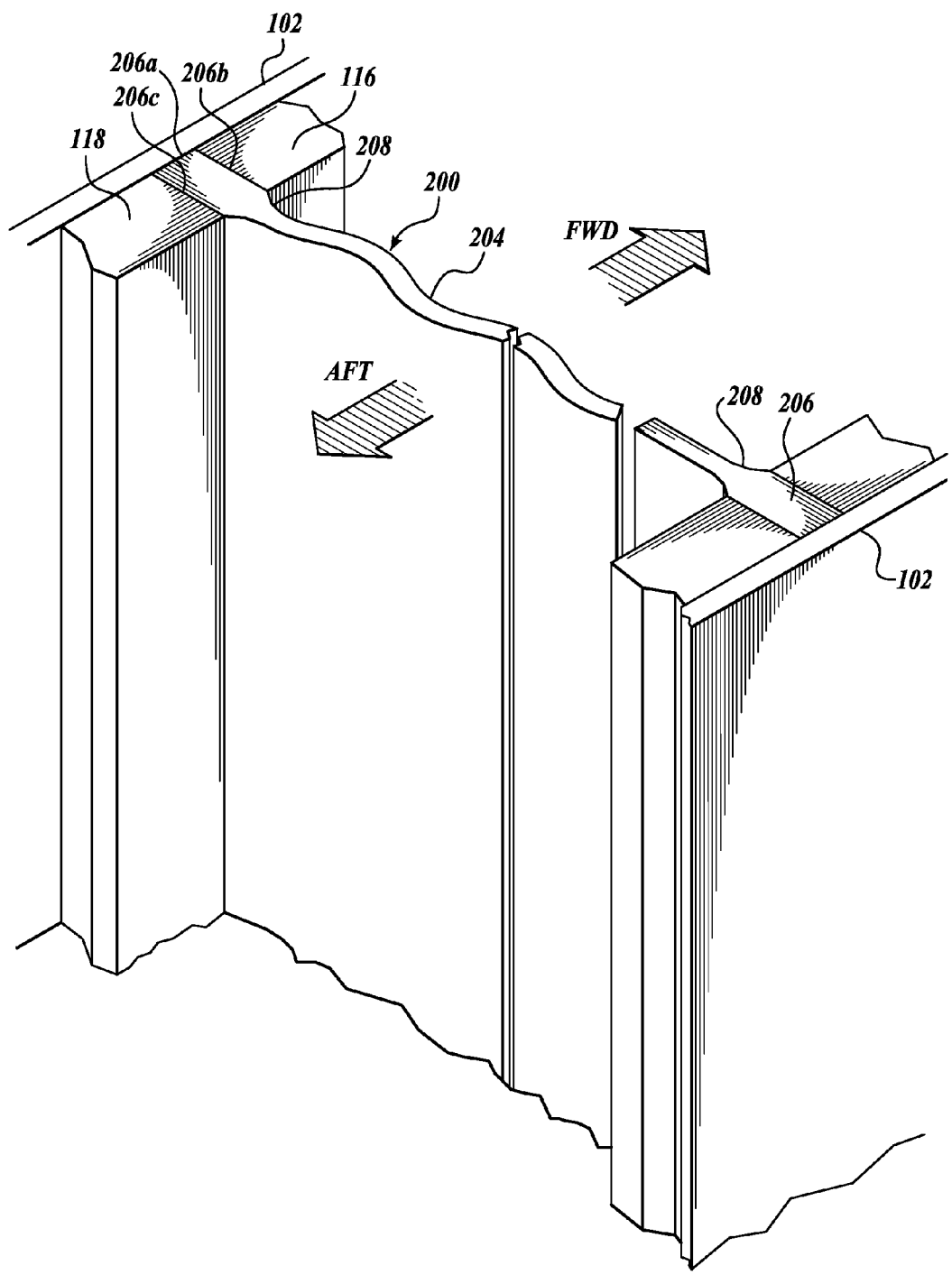
FIG. 2 is partial isometric view of another example of a partition assembly.

A partition assembly in accordance with one embodiment of the present disclosure may be best understood by referring to FIGS. 1 and 2. Referring first to FIG. 1, there is shown a support structure 102, e.g. a pillar or the like, fixedly mounted within the interior of a vehicle (not shown). The support structure 102 includes outer and inner surfaces 104 and 106 and first and second sides 110 and 112. When disposed within the vehicle, the first side 110 of the support structure 102 is located proximate a forward compartment, such as a cab of a heavy duty tractor, and the second side 112 of the support structure 102 is located proximate an aft compartment, such as the sleeper section of a heavy duty tractor. As best shown in FIG. 2, a second support structure 102 of identical or substantially similar construction as support structure 102 is disposed on the opposite side of the vehicle. The support structures may be a singular rigid or semi rigid member or may be of two or more rigid or semi-rigid members arranged side by side or in an overlapping configuration.

Returning to FIG. 1, secured to the first end 110 of the inner surface 106 of the vertical support structure 102 is a panel, a trim member or other interior finishing member ("collectively referred to as "trim"), generally designated 116, associated with the forward compartment. In addition, a panel, a trim member or other interior finishing member ("collectively referred to as "trim") associated with the aft compartment and generally designated 118 is secured to the second end 112 of the inner surface 106 of the support structure 102 a spaced distance apart from the forward trim 116, thereby creating a gap 120 therebetween. In the illustrated embodiment, the gap 120 is defined by the inner surface 106 of the support structure 102, a side surface 122 of the forward trim 116, and a side surface 124 of the aft trim 118. As will be explained in more detail below, the partition assemblies disclosed herein may be secured to the vehicle via the gap 120.

Turning now to FIG. 2, there is shown a portion of a partition assembly 200 in accordance with one embodiment of the present disclosure. The partition assembly 200 includes a main portion 204, such as a curtain, divider, etc. The main portion 204 is suitably sized and shaped to traverse across an interior portion of the vehicle thereby creating a barrier between at least a portion of the forward compartment and a portion of the aft compartment. The main portion 204 of the partition assembly 200 may be formed of a flexible material, such as a textile, fabric, leather, plastic, vinyl or other flexible or semi-flexible materials. In that regard, the main portion 204 of the partition assembly 200 may drape across the interior portion of the vehicle like a curtain.

In some embodiments, the main portion 204 may be a discrete component. In these embodiments, the main portion may include a slit or other configuration known in the art to provide access between the formed and aft compartments when the partition assembly is traversed from one side of the vehicle to the other. In other embodiments, the main portion may be comprised of two or more separate components, such as panels or sections, which are configured to be aligned in order to create a contiguous barrier as the partition assembly traverses from one side of the vehicle to the other. Again, in these latter embodiments, the main portion may include access between the forward and aft compartments.

Still referring to FIG. 2, the partition assembly 200 also includes one or more connection interfaces 206 provided along at least one of, and in some embodiments both of, the lateral ends 208 of the main portion 204 for interfacing with the gap 120 (See FIG. 1), forward trim 116, and/or aft trim 118. Each connection interface 206 is configured to secure its respective lateral end 208 of the partition assembly 200 to, for example, a side of the vehicle. For example, each connection interface 206 may include outer surfaces 206a-c that are configured to cooperatively engage with one or more surfaces defining the gap 120, such as side surface 124, inner surface 106, and/or side surface 122, respectively. In that regard, the connection interface 206 can be configured to be held in the gap 120 via removable or non-removable fasteners, including mechanical or chemical fasteners, etc.

In one embodiment, one or both of the connection interfaces 206 are suitable sized and configured to fit into and at least partially fill the gap 120, thereby holding the connection interface 206 within the gap 120 via frictional forces. In the illustrated embodiment, the connection interface 206 is substantially rectangular in shape and is held within the gap 120 via factional forces between the opposing side surfaces 122 and 124 of the forward and aft trims 116 and 118. It is to be appreciated, however, that the connection interface 206 may be any shape that allows the outer surfaces 206 thereof to engage with sufficient surface area of the gap, such as one of the side surface 124 of the aft trim 118, the side surface 122 of the forward trim 116, and/or inner surface 106 of the support structure 102. Non-limiting examples include square, oval, circular, serpentine, or any other shape that will create frictional forces between outer surfaces thereof and surfaces of the gap 120.

In some embodiments, the connection interfaces 206 are formed from a compressible material, such as foam, and are configured to compress when placed in the gap 120 thereby further holding the connection interface 206 in the gap 120. It will be appreciated that the use of foam in the connection interfaces allows the connection interface to conform to any non-symmetrical gap shape as well as slightly misaligned or uneven trim pieces that can occur during assembly or refurbishing of the vehicle. This provides many benefits, including an aesthetically pleasing finish between the fore and aft compartments. In some embodiments, one or more of the connection interfaces 206 may be press fit into the gap 120.

To further assist in holding the connection interface 206 within the gap 120, the connection interface 206 may also include fasteners (not shown) on one or more of the outer surfaces 206a-c configured to either releasably or permanently secure the partition assembly 200 to one or more of the surfaces of the gap 120. For instance, fasteners may be used to releasably couple the connection interface 206 to one or more of the inner surface 106 of the support structure 102, the side surface 124 of the aft interior trim 118, and/or the side surface 122 of the forward interior trim 116. Non-limiting examples for these fasteners include snaps, hooks and loops, or other fasteners capable of securing the connection interfaces 206 to the vehicle in a releasable manner. In other embodiments, the connection interfaces 206 on at least one side of the partition assembly 200 may be secured to one of the surfaces within the gap 120 via non-releasable fasteners. Non-limiting examples for these fasteners include rivets, staples, adhesive, or other fasteners capable of securing the connection interfaces 206 to the vehicle in a non-releasable manner. It is to be appreciated that in some embodiments, the connection interfaces 206 may be held in place within the gap 120 by the fasteners, without the frictional forces described above.

Although not shown in the illustrated embodiment, in an alternative embodiment, one or both of the connection interfaces 206 may be the vertical ends 208 of the main portion 204. In this embodiment, the connection interface 206 may be draped across the inner surface 106 of the support structure 120 and at least one of the side surfaces 122 and 124 of the trim 116 and 118, respectively. As described above, fasteners may be used to secure the lateral ends 208 of the main portion 204 to one or more of the above mentioned surfaces in the gap 120.

Figure 3:
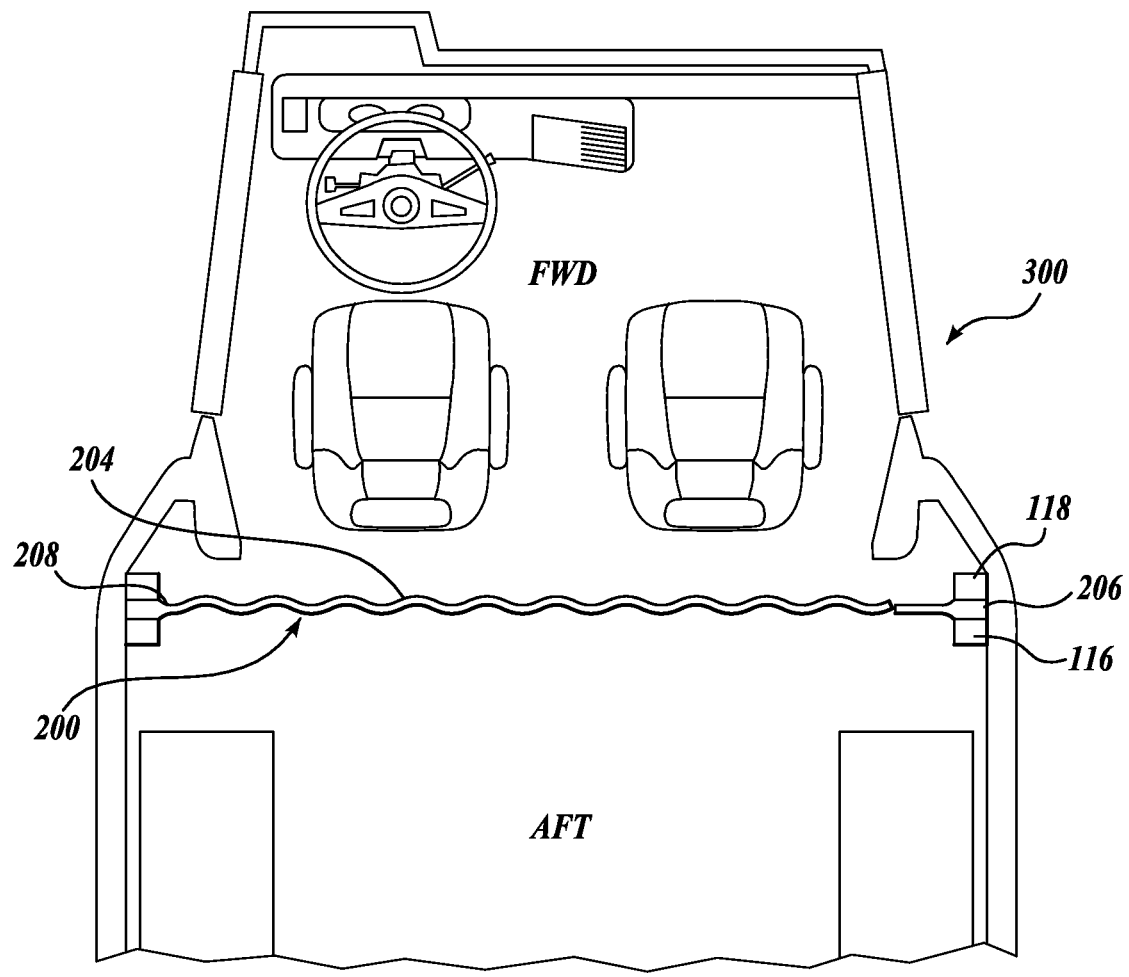
FIG. 3 is a plan view of a vehicle comprising the partition assembly of FIG. 2 installed therein.

Turning now to FIG. 3, there is shown plan view of a vehicle 300 having the partition assembly 200 of FIG. 2 installed therein. When both of the connection interfaces 206 of the partition assembly 200 are positioned within the corresponding gaps 120 at opposite sides of the vehicle 300 as is illustrated in FIG. 3, the partition assembly 200 is in a closed position. In that regard, the main portion 204 of the partition assembly 200 is configured to fill at least a portion of the space between the opposing, support structures 102 thereby creating a barrier between the cab compartment and the sleeper compartment. One or both connection interfaces 206 of the partition assembly 200 may be removed from the gap 120 thereby removing the barrier between the forward compartment and the aft compartment. In other embodiments, the connection interfaces 206 can be permanently secured in the gap. In these embodiments, access between the compartments can be provided via slits, doors, etc. in the main portion of the partition assembly 200.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the disclosure in which an exclusive property or privilege is claimed are defined as follows:

1. A partition assembly for use in a vehicle, the vehicle including opposing first and second support structures each having a first interior trim secured thereto and a second interior trim secured thereto at a spaced apart distance from the first interior trim, thereby creating a gap therebetween, the partition assembly comprising:
   a main portion configured to traverse an interior portion of the vehicle, thereby creating at least a partial barrier between a first interior space in the vehicle and a second interior space in the vehicle; and
   connection interfaces located at lateral ends of the main portion, wherein the connection interfaces include at least one outer surface, and wherein the connection interfaces are configured to fit within the respective gaps and be secured to the vehicle between the at least one outer surface of the connection interfaces and one or more surfaces in the gap;
   wherein the connection interfaces are each formed from a compressible material and are in a compressed state when inserted within the respective gap.

2. The partition assembly of claim 1, wherein the compressible material is foam.

3. The partition assembly of claim 1, wherein the main portion laterally traverses across the entire vehicle when the connection interfaces are disposed within the respective gaps.

4. The partition assembly of claim 1, wherein the main portion is formed from a flexible material.

5. The partition assembly of claim 1, wherein the connection interfaces extend along the entire length of the lateral end of the main portion.

6. A vehicle comprising:
   a first interior space;
   a second interior space;
   a support structure having a first end proximate the first interior space and a second end proximate the second interior space;
   a first interior trim secured to the support structure at the first end;
   a second interior trim secured to the support structure at the second end a spaced apart distance from the first interior trim, thereby creating a gap therebetween; and
   a partition assembly comprising:
      a main portion configured to traverse an interior portion of the vehicle, thereby creating at least a partial barrier between the first interior space and the second interior space; and
      a connection interface located at a lateral end of the main portion, wherein the connection interface is configured to fit into the gap and to secure to the vehicle via frictional forces, wherein the connection interface is formed of a compressible material and is placed in a compressed state when inserted into the gap.

7. The vehicle of claim 6, wherein the connection interface extends along the entire length of the vertical end of the main portion.

8. The vehicle of claim 6, wherein the compressible material is foam.

9. The vehicle of claim 6, wherein the connection interface includes opposite first and second surfaces, and wherein the connection interface secures to the vehicle via frictional forces between the first and second surfaces of the connection interface and surfaces of the first and second interior trims.

10. The vehicle of claim 9, wherein the connection interface is a first connection interface and the lateral end is a first lateral end, the partition assembly further includes a second connection interface located at a second lateral end of the main portion.

11. A vehicle comprising:
   an enclosed area defining a forward interior space and an aft interior space;
   first and second opposing support structures, each having a first end proximate the forward interior space and a second end proximate the aft interior space;
   first and second forward interior trim secured to the first and second support structures at the first end;
   first and second aft interior trim secured to the first and second support structures at the second end, the first and second aft interior trim secured to the first and second support structures a spaced apart distance from the first and second forward interior trim thereby creating a gap therebetween; and
   a partition assembly comprising:
      a main portion configured to traverse an interior portion of the vehicle, thereby creating at least a partial barrier between the forward interior space and the aft interior space; and
      connection interfaces located at respective lateral ends of the main portion, wherein the connection interfaces are configured to fit into the gaps and are secured within the gaps such that the main portion traverses the interior portion of the vehicle.

12. The vehicle of claim 11, wherein the connection interfaces have opposing first and second surfaces, and wherein the connection interfaces are configured to be secured within the gap via frictional forces between the first and second surfaces and surfaces of the forward and aft interior trims.

13. The vehicle of claim 11, wherein the connection interfaces extend along an entire length of the respective lateral ends of the main portion.

14. The vehicle of claim 11, wherein the connection interfaces are formed of a compressible material and are placed in a compressed state when inserted into the gap.

15. The vehicle of claim 14, wherein the compressible material is foam.

* * * * *